(12) United States Patent
David et al.

(10) Patent No.: US 12,179,583 B2
(45) Date of Patent: Dec. 31, 2024

(54) SYSTEM AND METHOD FOR CONTROLLING A TANDEM AXLE

(71) Applicant: Dana Heavy Vehicle Systems Group, LLC, Maumee, OH (US)

(72) Inventors: Jeffrey M. David, Cedar Park, TX (US); Jason A. Sidders, Perrysburg, OH (US); Gustav Johnson, Canton, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 16 days.

(21) Appl. No.: 18/169,726

(22) Filed: Feb. 15, 2023

(65) Prior Publication Data

US 2024/0270069 A1 Aug. 15, 2024

(51) Int. Cl.
*B60K 17/36* (2006.01)
*B60K 23/04* (2006.01)
*B60K 23/08* (2006.01)

(52) U.S. Cl.
CPC ............ *B60K 17/36* (2013.01); *B60K 23/04* (2013.01); *B60K 23/0808* (2013.01); *B60K 2023/043* (2013.01)

(58) Field of Classification Search
CPC .... B60K 17/36; B60K 23/04; B60K 23/0808; B60K 2023/043
See application file for complete search history.

(56) References Cited

U.S. PATENT DOCUMENTS

| | | | |
|---|---|---|---|
| 5,327,346 A * | 7/1994 | Goodell | B60C 23/00318 152/416 |
| 6,499,552 B2 * | 12/2002 | Bell | B60C 23/002 180/24.09 |
| 8,594,870 B2 | 11/2013 | Asahara et al. | |
| 8,694,189 B2 | 4/2014 | Motosugi et al. | |
| 8,718,854 B2 | 5/2014 | Hashimoto | |
| 8,892,281 B2 | 11/2014 | Suzuki et al. | |
| 8,925,946 B2 * | 1/2015 | Albert | B60G 17/018 280/124.157 |
| 10,214,219 B2 | 2/2019 | Richards et al. | |
| 10,486,547 B2 | 11/2019 | Suzuki et al. | |
| 11,148,529 B1 * | 10/2021 | Willford | B60K 23/0808 |
| 11,808,342 B2 * | 11/2023 | Dawson | F16H 57/037 |
| 2002/0179345 A1 * | 12/2002 | Bell | B60C 23/002 280/405.1 |
| 2009/0166106 A1 * | 7/2009 | Batdorf | B60K 7/0007 180/24.06 |
| 2014/0129100 A1 * | 5/2014 | Nellums | B60W 10/14 477/115 |
| 2015/0314678 A1 * | 11/2015 | Ekonen | B60K 17/35 180/383 |
| 2017/0274855 A1 * | 9/2017 | Laskey | G08G 1/0141 |
| 2017/0361707 A1 * | 12/2017 | Flogård | B60K 23/0808 |
| 2018/0236994 A1 * | 8/2018 | Healy | B60K 6/22 |

(Continued)

*Primary Examiner* — Toan C To

(74) *Attorney, Agent, or Firm* — McCoy Russell LLP

(57) ABSTRACT

Methods and systems for operating a tandem axle that includes two electric machine propulsion sources are described. In one example, a controller determines a presence or absence of a beat signal that may be generated via rotating components of the tandem axle. Operation of the tandem axle may be adjusted in response to detection of the beat signal.

20 Claims, 6 Drawing Sheets

(56) References Cited

U.S. PATENT DOCUMENTS

| | | | |
|---|---|---|---|
| 2020/0148058 A1* | 5/2020 | Eschenburg | B60K 17/36 |
| 2020/0355257 A1* | 11/2020 | Gries | B60T 8/329 |
| 2021/0362577 A1* | 11/2021 | Laforce | B60K 1/00 |
| 2023/0054823 A1* | 2/2023 | David | B60L 15/2045 |
| 2024/0026938 A1* | 1/2024 | Paielli | F16D 28/00 |
| 2024/0059290 A1* | 2/2024 | Falcone | B60W 10/184 |

* cited by examiner

SYSTEM AND METHOD FOR CONTROLLING A TANDEM AXLE

TECHNICAL FIELD

The present disclosure relates to a system and method for controlling noise and vibration of a tandem axle system. The system and method may be applied to electrified tandem axles.

BACKGROUND AND SUMMARY

Heavy trucks may include tandem axles to increase load carrying capacity and traction. Tandem axles are commonly driven via two shafts, such as a first drive shaft that extends from a propulsion source to a first axle and a second drive shaft that extends from the first axle to a second axle of the tandem axles. However, in an effort to reduce vehicle emissions, electrified tandem axles have been developed. An electrified tandem axle (e.g., an axle that includes an electric propulsion source) may include an electric machine as a propulsion source at each axle so that there is no need for drive shafts. However, electrified axles may also exhibit characteristics that may be less common to shaft driven axles. For example, it may be possible for "beat" frequencies to develop in electrified axle. The beat frequencies may be audible and/or the beat frequencies may be transmitted through the vehicle's structure (e.g., axles and frame). Beat frequencies generated by a tandem axle may be formed due to a combination of a first signal that is generated in a first axle of the tandem axle and a second signal that is generated in the second axle of the tandem axle. The first signal may be generated via the rotation of an electric machine and rotating components in the first axle. The second signal may be generated via the rotation of an electric machine and rotating components in the second axle.

The inventors herein have recognized the abovementioned issues and have developed a method for operating a tandem axle of a vehicle, comprising: adjusting operation of a first axle via a controller in response to a presence of a beat signal generated via the first axle and a second axle.

By adjusting operation of an axle in response to an indication of a beat signal, it may be possible to provide the technical result of lowering the power level of the beat signal so that the beat signal may not be apparent to a vehicle operator. For example, if a beat signal is detected or if operating conditions are detected that are expected to result in a beat signal, operation of an axle may be adjusted to reduce the possibility of generating the beat signal. In one example, torque output of one or more axles of the tandem axle may be adjusted to lower the power level of the beat signal.

The system and method may provide several advantages. Specifically, the system and methods described herein may provide requested driver demand while lowering a possibility of generating beat noise from two axles. In addition, the present system and methods may adjust an amount of beat noise that may be generated while a vehicle is turning based on a steering angle. Further, the system and methods may adjust an amount of beat noise that may be generated due to differences in tire size.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
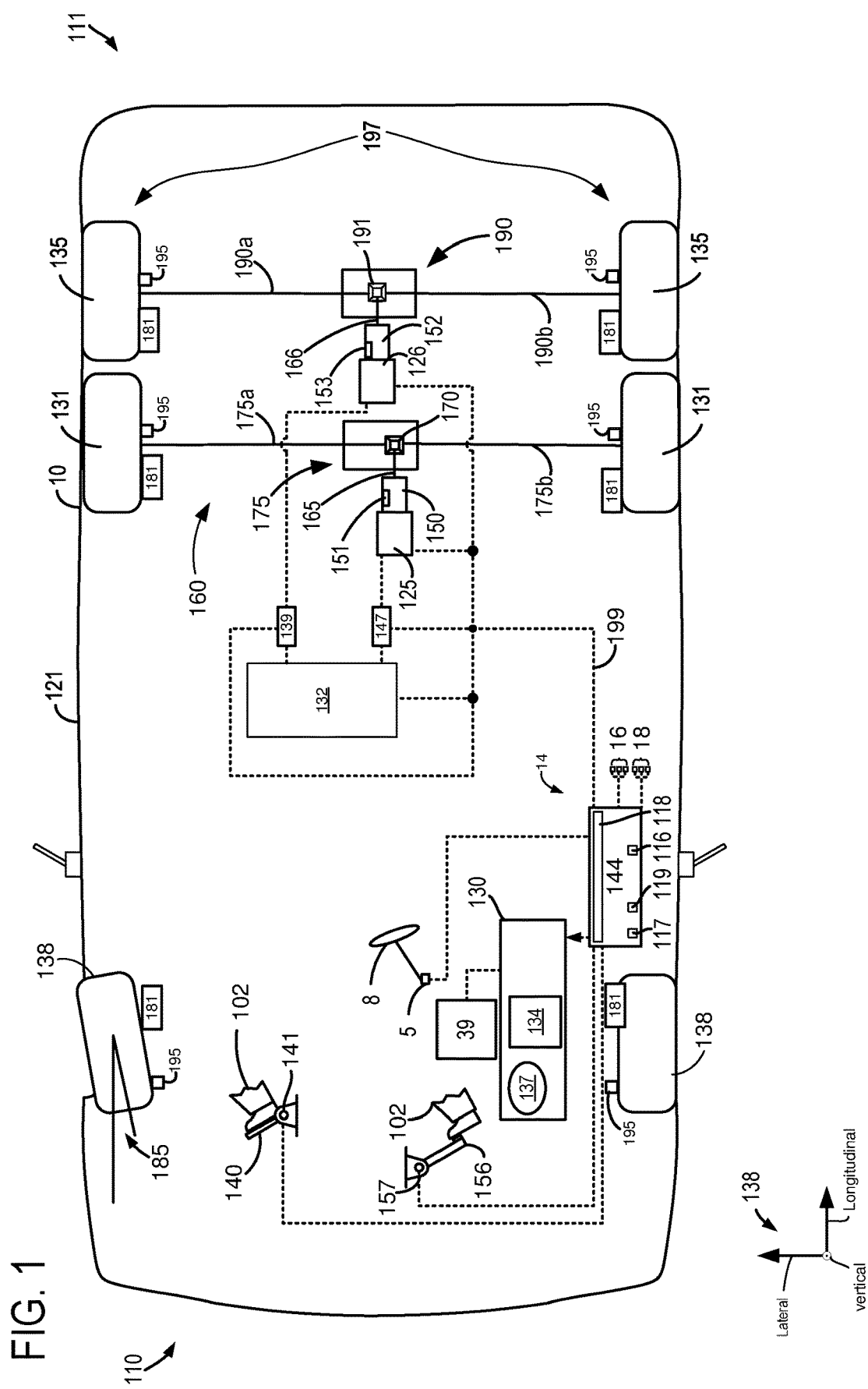
FIG. 1 shows a schematic representation of a vehicle and driveline that may be operated as described herein.
Figure 2:
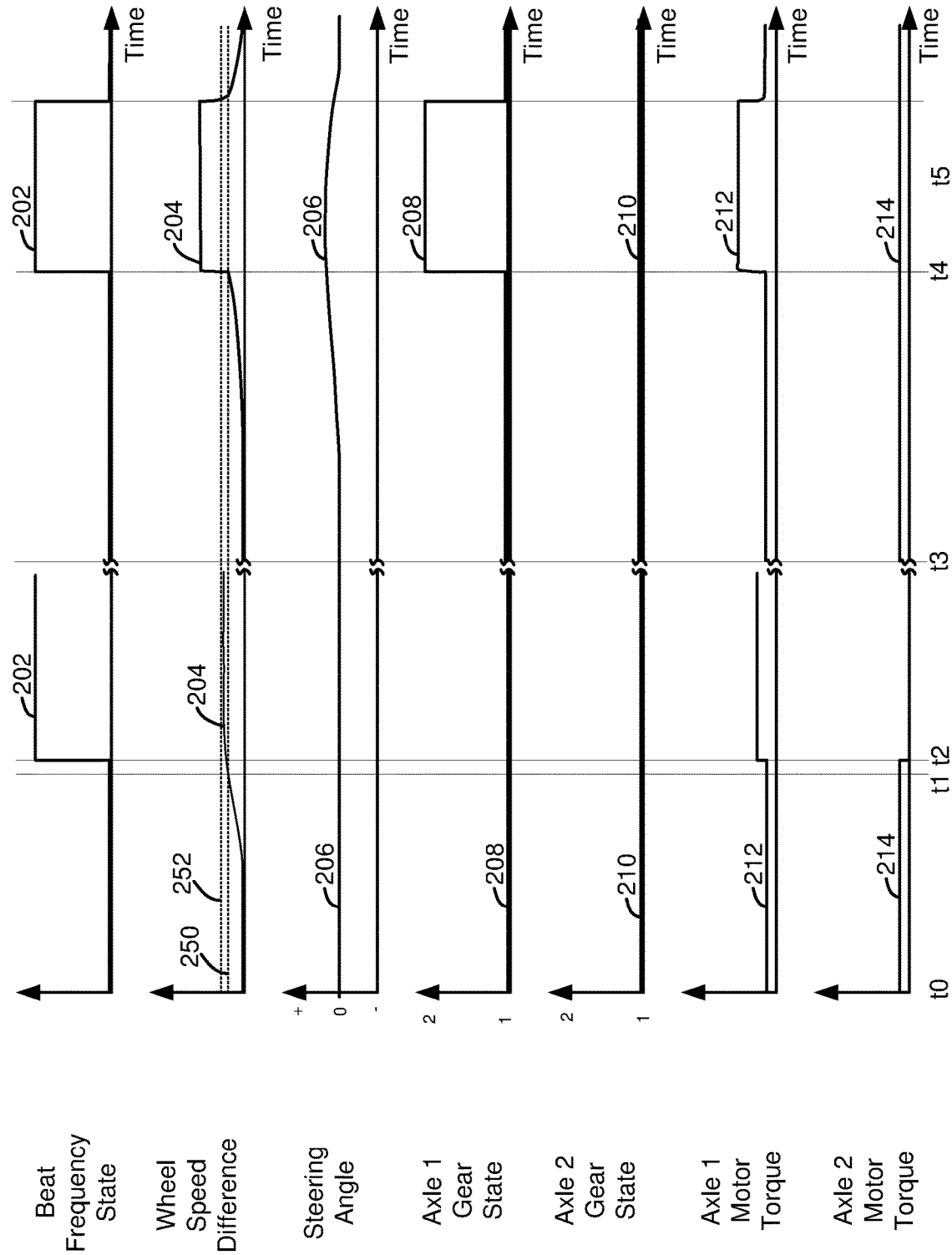
FIG. 2 shows an example vehicle operating sequence according to the method of FIGS. 3-5.
Figure 6:
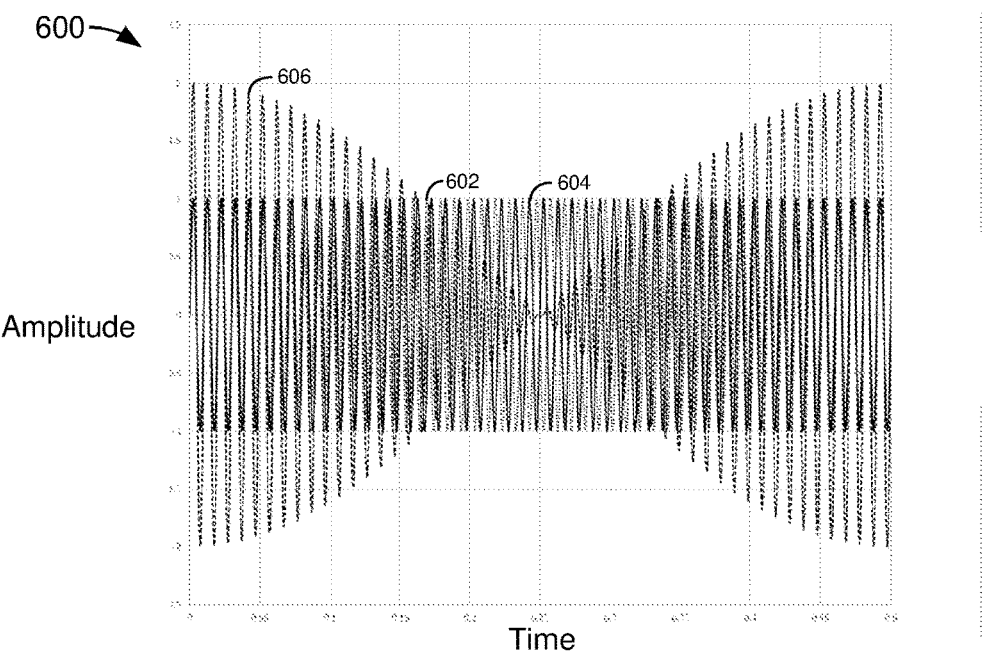
FIG. 6 shows an example beat signal.
Figure 7:
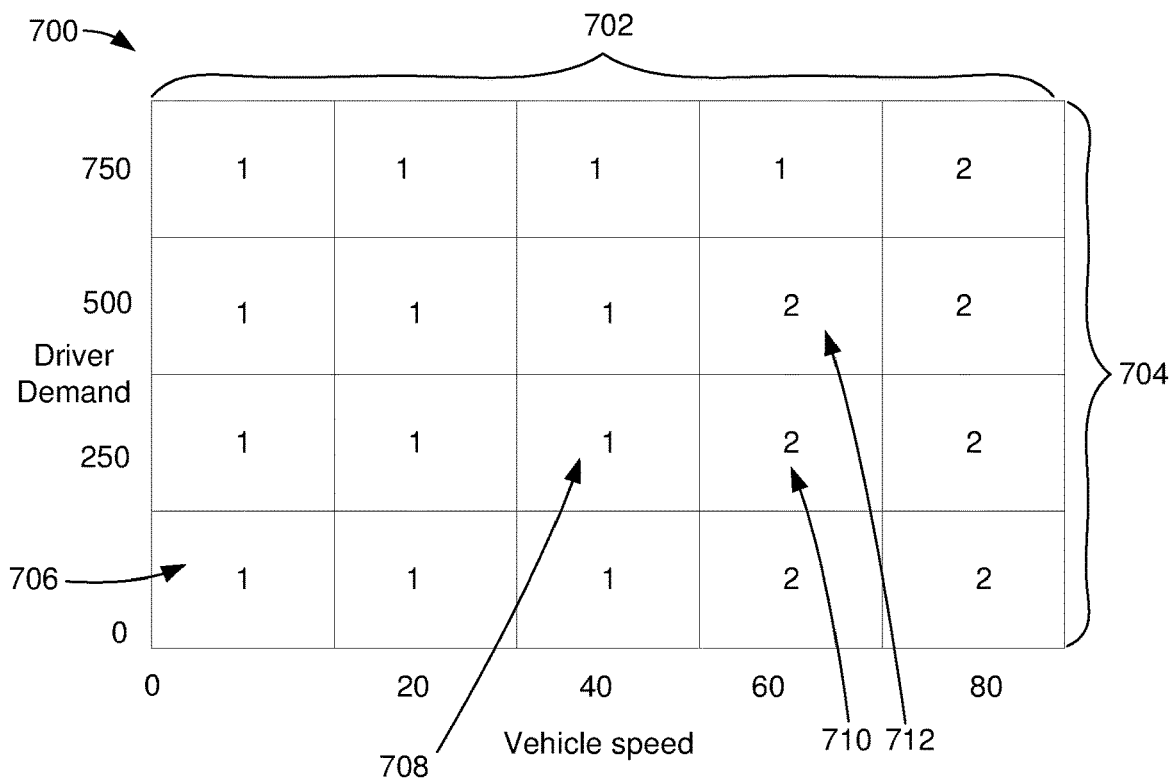
FIG. 7 shows an example gear shift schedule for an axle.

A vehicle may include a tandem axle to increase a vehicle's load capacity and improve vehicle traction. In an effort to reduce emissions, some vehicle axles have been electrified so that a propulsion force may be provided via an electric machine that is integrated into the axle. Tandem electrified axles may include two electric machines, one for each axle, as shown in FIG. 1. The tandem axle may be operated as shown in the sequence of FIG. 2 in response to inferring or sensing a beat signal that may be generated by combining noise signals from each axle of the tandem axle. In one example, torque that is generated by each of the two axles in the tandem axle may be adjusted so as to avoid generating a beat signal. In another example, a gear shifting schedule may be adjusted so that signals from two axles of a tandem axle do not combine to generate a beat signal. An example beat signal is shown in FIG. 6. An example gear shift schedule for an electrified axle is shown in FIG. 7.

FIG. 1 illustrates an example vehicle 121 that includes an electrified tandem axle 160. The electrified tandem axle 160 operates as a propulsion system for vehicle 121. Throughout the description of FIG. 1, mechanical connections between various components are illustrated as solid lines, whereas electrical connections between various components are illustrated as dashed lines.

A front portion of vehicle 121 is indicated at 110 and a rear portion of vehicle 121 is indicated at 111. Vehicle 121 includes front wheels 138, a first pair of rear wheels 131, and a second pair of rear wheels 135. Tandem axle 160 includes at two propulsion sources including first or front electric machine 125 and a second or rear electric machine 126. Electric machines 125 and 126 may consume or generate electrical power depending on their operating mode. Vehicle 121 includes a first electric machine (e.g., a propulsion source) 125 that may selectively provide propulsive effort to tandem axle 160. In particular, first electric machine 125 is shown mechanically coupled to gearbox 150 including a plurality of gears 151, and gearbox 150 is mechanically coupled to a first or front axle 175 of tandem axle 160. First electric machine 125 may provide mechanical power to gearbox 150. Front axle 175 may receive mechanical power from gearbox 150 via driveshaft 165 so that mechanical power may be transmitted to rear wheels 131. Front axle 175 may also be comprised of two half shafts, including a first or right haft shaft 175a and a second or left half shaft 175b. The front axle 175 may be an integrated axle that includes a front axle differential gear set or final drive 170.

Vehicle 121 also includes a second electric machine (e.g., a propulsion source) 126 that may selectively provide propulsive effort to tandem axle 160. In particular, second electric machine 126 is shown mechanically coupled to gearbox 152 including a plurality of gears 153, and gearbox 152 is mechanically coupled to a rear axle 190 of tandem axle 160. Second electric machine 126 may provide mechanical power to gearbox 152. Rear axle 190 may receive mechanical power from gearbox 152 via driveshaft 166 so that mechanical power may be transmitted to rear wheels 135. Rear axle 190 also comprises two half shafts, including a first or right haft shaft 190*a* and a second or left half shaft 190*b*. The rear axle 190 may be an integrated axle that includes a rear axle differential gear set or final drive 191.

Electric machines 125 and 126 are electrically coupled to and may receive electrical power from onboard electrical energy storage device 132. Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 139 may convert alternating current generated by second electric machine 126 to direct current for storage at the electric energy storage device 132 and vice versa. A second inverter system controller (ISC2) 147 may convert alternating current generated by first electric machine 125 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Controller 144 may communicate with one or more of electric machine 125, electric machine 126, first inverter system controller 139, second inverter system controller 147, and energy storage device 132 via controller area network Controller 144 may receive sensory feedback information from one or more of electric machine 125, electric machine 126, first inverter system controller 139, second inverter system controller 147, energy storage device 132, etc. Further, controller 144 may send control signals to one or more of electric machine 125, electric machine 126, first inverter system controller 139, second inverter system controller 147, energy storage device 132, etc., responsive to this sensory feedback. Controller 144 may receive an indication of an operator requested output (e.g., driver demand) of the vehicle propulsion system from a human operator 102, or an autonomous controller. For example, controller 144 may receive sensory feedback from driver demand pedal position sensor 141 which communicates with pedal 140. Pedal 140 may refer schematically to a driver demand pedal. Similarly, controller 144 may receive an indication of an operator requested vehicle braking via a human operator 102, or an autonomous controller. For example, control system 14 may receive sensory feedback from pedal position sensor 157 which communicates with brake pedal 156. Controller 144 may provide vehicle braking solely via electric machines 125/126, solely via friction foundation brakes 181 (e.g., brake pads and rotors), of via a combination of electric machines 125/126 and friction foundation brakes 181. The vehicle braking torque that may be applied by electric machines 125/126 and friction foundations brakes may be based on a braking torque amount that is requested via brake pedal 156. Controller 144 may also receive a signal from steering angle sensor 5 which monitors a position of steering wheel 8 to provide an estimate of steering angle 185. Steering angle 185 is an angle of front wheels 138 relative to a position where front wheels 138 cause vehicle 121 to travel in a straight direction.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Controller 144 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 144, regarding various states of electric machine operation. Controller 144 includes non-transitory (e.g., read only memory) 117, random access memory 119, digital inputs/outputs 118, and a microcontroller 116.

Vehicle 121 may also include an on-board navigation system 39 (for example, a Global Positioning System) on dashboard 130 that an operator of the vehicle may interact with. The navigation system 39 may include one or more location sensors for assisting in estimating a location (e.g., geographical coordinates) of the vehicle. For example, on-board navigation system 39 may receive signals from GPS satellites (not shown), and from the signal identify the geographical location of the vehicle. In some examples, the geographical location coordinates may be communicated to controller 144.

Dashboard 130 may further include a display system 137 configured to display information to the vehicle operator. Display system 137 may comprise, as a non-limiting example, a touchscreen, or human machine interface (HMI), display which enables the vehicle operator to view graphical information as well as input commands. In some examples, display system 137 may be connected wirelessly to the internet (not shown) via controller (e.g. 144). As such, in some examples, the vehicle operator may communicate via display system 137 with an internet site or software application (app).

Dashboard 30 may further include an operator interface 134 via which the vehicle operator may adjust the operating status of the vehicle. Specifically, the operator interface 134 may be configured to initiate and/or terminate operation of the vehicle driveline (e.g., electric machine 125 and electric machine 126) based on an operator input. Various examples of the operator interface 134 may include interfaces that require a physical apparatus, such as an active key, that may be inserted into the operator interface 134 to start the electric machines 125 and 126 and to turn on the vehicle, or may be removed to shut down the electric machines 125 and 126 to turn off the vehicle. Other examples may include a passive key that is communicatively coupled to the operator interface 134. The passive key may be configured as an electronic key fob or a smart key that does not have to be inserted or removed from the operator interface 134 to operate the vehicle electric machines 125 and 126. Rather, the passive key may need to be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 144 to start the engine.

Thus, the system of FIG. 1 provides for a tandem axle system, comprising: a first axle including a first electric machine configured to provide propulsive effort via the first axle; a second axle including a second electric machine configured to provide propulsive effort via a second axle; and a controller including executable instructions stored in non-transitory memory that cause the controller to adjust operation of the first axle and the second axle in response to a beat signal, the beat signal generated via combining a first signal generated via the first axle and a second signal generated via the second axle. In a first example, the tandem axle system includes where adjusting operation of the first axle includes adjusting a first axle torque output, and where adjusting operation of the second axle includes adjusting a second axle torque output. In a second example that may include the first example, the tandem axle system includes where adjusting operation of the first axle includes adjusting a gear shifting schedule of the first axle. In a third example that may include one or both of the first and second examples, the tandem axle system includes where adjusting operation of the second axle includes adjusting a gear shifting schedule of the second axle. In a fourth example that may include one or more of the first through third examples, the tandem axle system further comprises additional instructions to determine a presence or absence of the beat signal. In a fifth example that may include one or more of the first through fourth examples, the tandem axle system includes where the presence or absence of the beat signal is based on a first wheel speed and a second wheel speed.

Referring now to FIG. 2, an example vehicle operating sequence is shown. The sequence of FIG. 2 may be provided via the systems of FIG. 1 in cooperation with the method of FIGS. 3-5. The plots shown in FIG. 2 are time aligned and they occur at a same time. The vertical lines at times t0-t5 represent times of interest in the sequence. The double SS marks along the horizontal axes represent a break in time and the break may be long or short in time duration.

The first plot from the top of FIG. 2 is a plot of a beat frequency state versus time. The vertical axis represents the beat frequency state and a beat frequency is detected or inferred when trace 202 is at a level that is near the vertical axis arrow. A beat frequency is not detected or inferred when trace 202 is at a level that is near the horizontal axis. The horizontal axis represents time and time increases from the left side of the plot to the right side of the plot. Trace 202 represents the beat signal state.

The second plot from the top of FIG. 2 is a plot of a difference in wheel speed between a first wheel of a first axle of a tandem axle and a second wheel of a second axle of the tandem axle versus time. The vertical axis represents the difference in wheel speed between the first wheel and the second wheel. The wheel speed difference increases in the direction of the vertical axis arrow. The wheel speed difference is zero at the level of the horizontal axis. The horizontal axis represents time and time increases from the left side of the plot to the right side of the plot. Trace 204 represents the wheel speed difference. Horizontal line 250 represents a first boundary of a speed difference where a beat signal is expected (e.g., a lower boundary). Horizontal line 252 represents a second boundary of the speed difference where the beat signal is expected (e.g., an upper boundary).

The third plot from the top of FIG. 2 is a plot that indicates a steering angle of the vehicle versus time. The vertical axis represents the steering angle and the steering angle is positive (e.g., right turn) when trace 206 is above the zero level. The steering angle is negative (e.g., left turn) when trace 206 is below the zero level. The horizontal axis represents time and time increases from the left side of the plot to the right side of the plot. Trace 206 represents the steering angle.

The fourth plot from the top of FIG. 2 is a plot that indicates a gear state of a first axle of a tandem axle versus time. The vertical axis represents the gear state for the first axle. In this example, the gear state may be first gear or second gear. In other examples, there may be additional gear states (e.g., 1-10). The gear state is first gear when trace 208 is near the level that is indicated by the number one. The gear state is second gear when trace 208 is near the level that is indicated by number two. The horizontal axis represents time and time increases from the left side of the plot to the right side of the plot. Trace 208 represents the gear state for the first axle of a tandem axle.

The fifth plot from the top of FIG. 2 is a plot that indicates a gear state of a second axle of a tandem axle versus time. The vertical axis represents the gear state for the second axle. In this example, the gear state may be first gear or second gear. In other examples, there may be additional gear states (e.g., 1-10). The gear state is first gear when trace 210 is near the level that is indicated by the number one. The gear state is second gear when trace 210 is near the level that is indicated by number two. The horizontal axis represents time and time increases from the left side of the plot to the right side of the plot. Trace 210 represents the gear state for the second axle of a tandem axle.

The sixth plot from the top of FIG. 2 is a plot that indicates a torque output of a motor of the first axle of the tandem axle versus time. The vertical axis represents the torque output of the motor of the first axle. The motor torque output amount increases in the direction of the vertical axis arrow. The horizontal axis represents time and time increases from the left side of the plot to the right side of the plot. Trace 212 represents the output torque of the first axle of the tandem axle.

The seventh plot from the top of FIG. 2 is a plot that indicates a torque output of a motor of a second axle of the tandem axle versus time. The vertical axis represents the torque output of the motor of the second axle. The motor torque output amount increases in the direction of the vertical axis arrow. The horizontal axis represents time and time increases from the left side of the plot to the right side of the plot. Trace 214 represents the output torque of the second axle of the tandem axle.

At time to, a beat signal is not sensed or inferred and the difference in wheel speed between a wheel of a first axle of the tandem axle and a wheel speed of a second axle of the tandem axle is zero. The steering angle is zero and the first axle and the second axle are engaged in first gear. The motor torque output of the first axle matches the motor torque output of the second axle.

At time t1, the wheel speed difference between a wheel of the first axle of the tandem axle and a wheel of the second axle has increased and the wheel speed difference is about to enter a range where a beat frequency may be expected to occur. The steering angle remains zero and the beat frequency is not yet indicated. The first and second axles remain in their respective first gears. The motor torque output of the first and second axles match to provide a requested driver demand torque (not shown).

At time t2, the beat frequency state changes to indicate that a beat frequency may be present. The wheel speed difference between the first axle and the second axle of a tandem axle is within the range defined by horizontal line 250 and horizontal line 252. The first axle of the tandem axle and the second axle of the tandem axle remain in first gear. However, the torque output of the motor of the first axle is increased and the motor torque output of the second axle is adjusted to zero so as to low a power level of a beat frequency (not shown). By lowering the motor torque output of the second axle and increasing motor torque output of the first axle, it may be possible to lower the power level of a beat signal that may be generated via rotating the motor of the first axle and the motor of the second axle. A break in the sequence occurs between time t2 and time t3.

At time t3, a second portion of the sequence begins and the beat frequency state is not asserted since a beat frequency is not detected or inferred at the present operating conditions. The wheel speed difference is zero and the steering angle is zero. The first axle and the second axle are both in their respective first gears. The motor torque output of the first axle is equal to the torque output of the second axle.

Between time t3 and time t4, the steering angle begins to change. Additionally, a wheel speed difference begins to increase between a wheel speed of the first axle and a wheel speed of the second axle as the vehicle turns. The beat frequency state indicates that a beat frequency is not detected or inferred. The axles remain in first gear and equal motor torque is delivered via the first and second axles.

At time t4, the wheel speed difference between a wheel of the first axle and a wheel of the second axle exceeds threshold 250. As a result, the controller shifts the first axle to second gear while the second axle remains in first gear. This causes the wheel speed difference to increase, thereby reducing the amount of power in any beat signal. The motor torque that is supplied to the first axle is also increased so that the driver demand torque may be met. The motor torque output of the second axle remains unchanged. Between time t4 and time t5, the steering angle advances from the zero angle and then it returns toward the zero angle.

At time t5, the steering angle has been adjusted closer to the zero angle so that the probability of producing a beat signal with sufficient power to disturb vehicle occupants and/or to exceed vehicle noise and vibration thresholds is mitigated. Therefore, the controller shifts the axle back to first gear and reduces motor torque output of the first axle. The beat frequency state is no longer asserted and the difference in wheel speed is lowered.

In these ways, a possibility of generating a beat signal may be lowered. Further, in situations where a beat signal is generated, the power of the beat signal may be reduced via shifting gears and/or adjusting motor or electric machine output torque.

Figure 3:
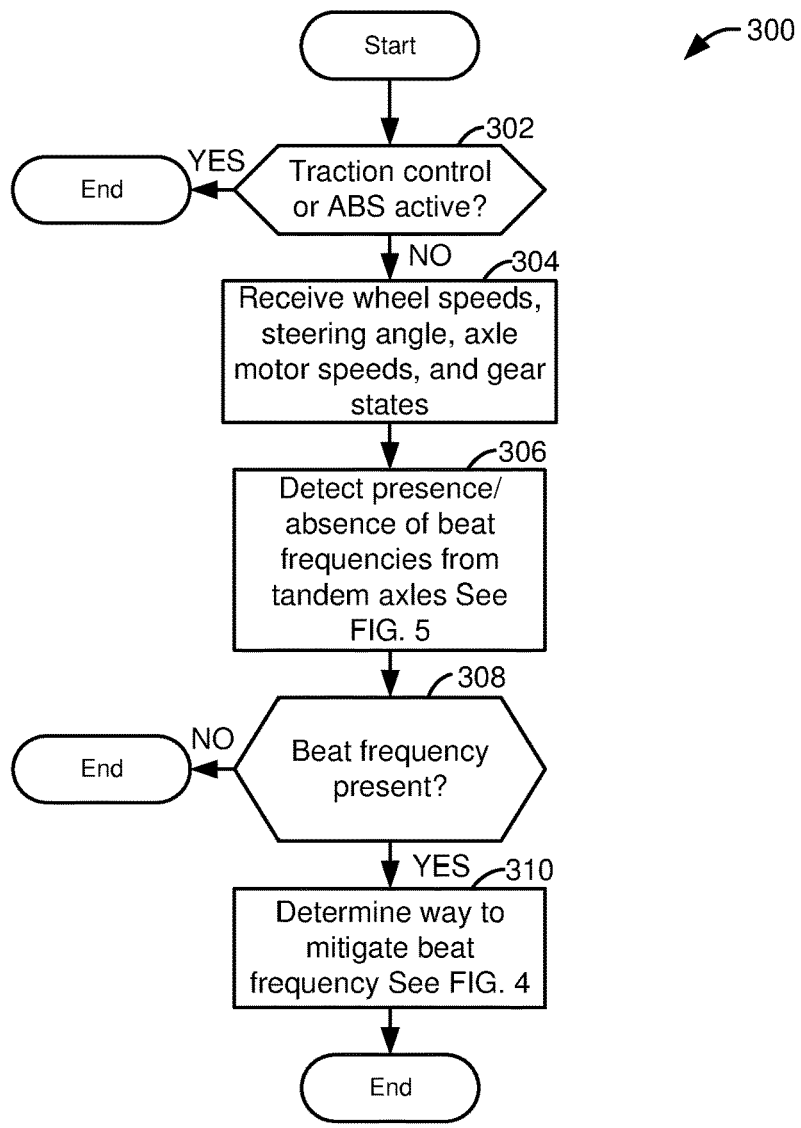
FIGS. 3-5 show an example method for operating a vehicle that includes a tandem axle.
Figure 4:
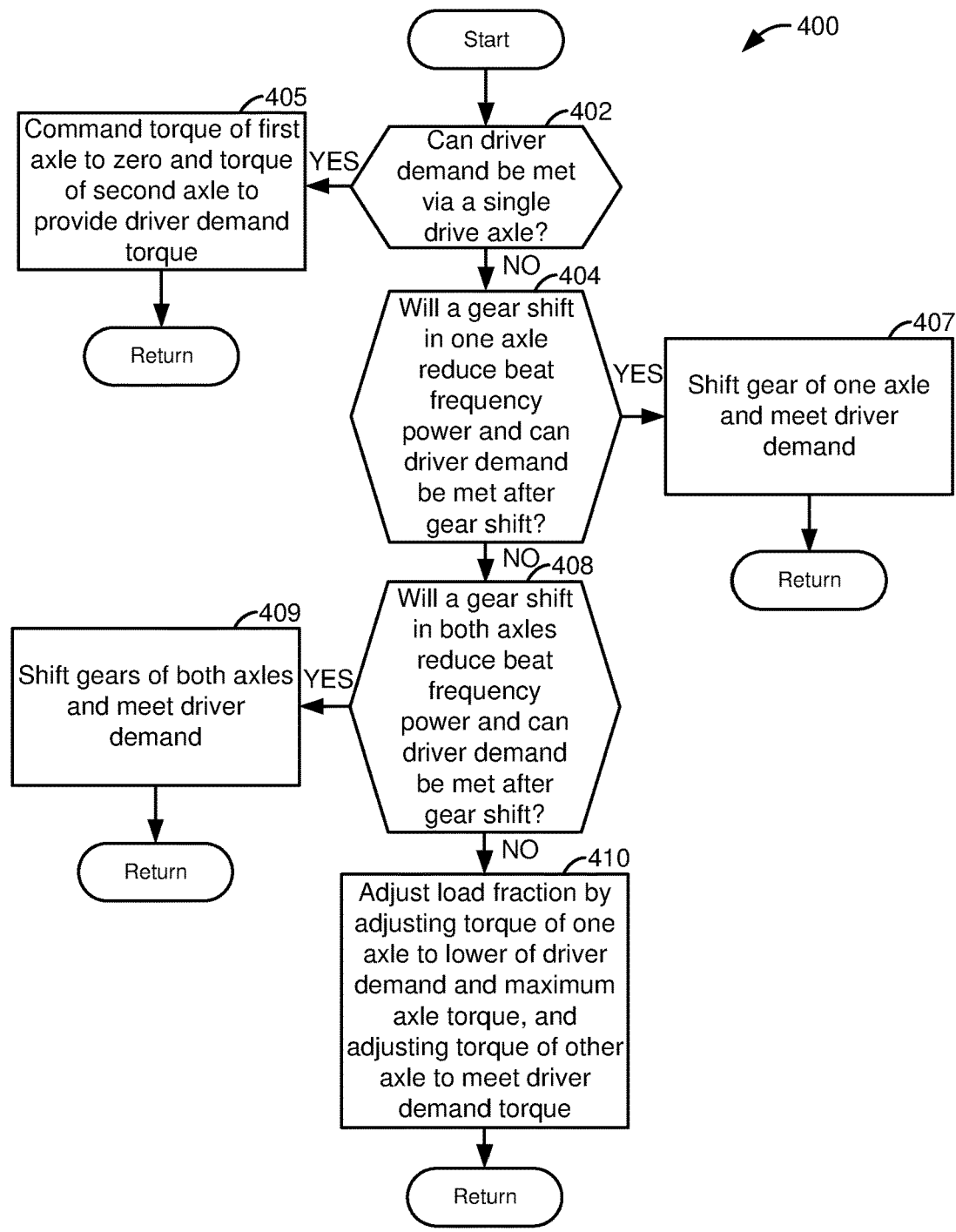
Figure 5:
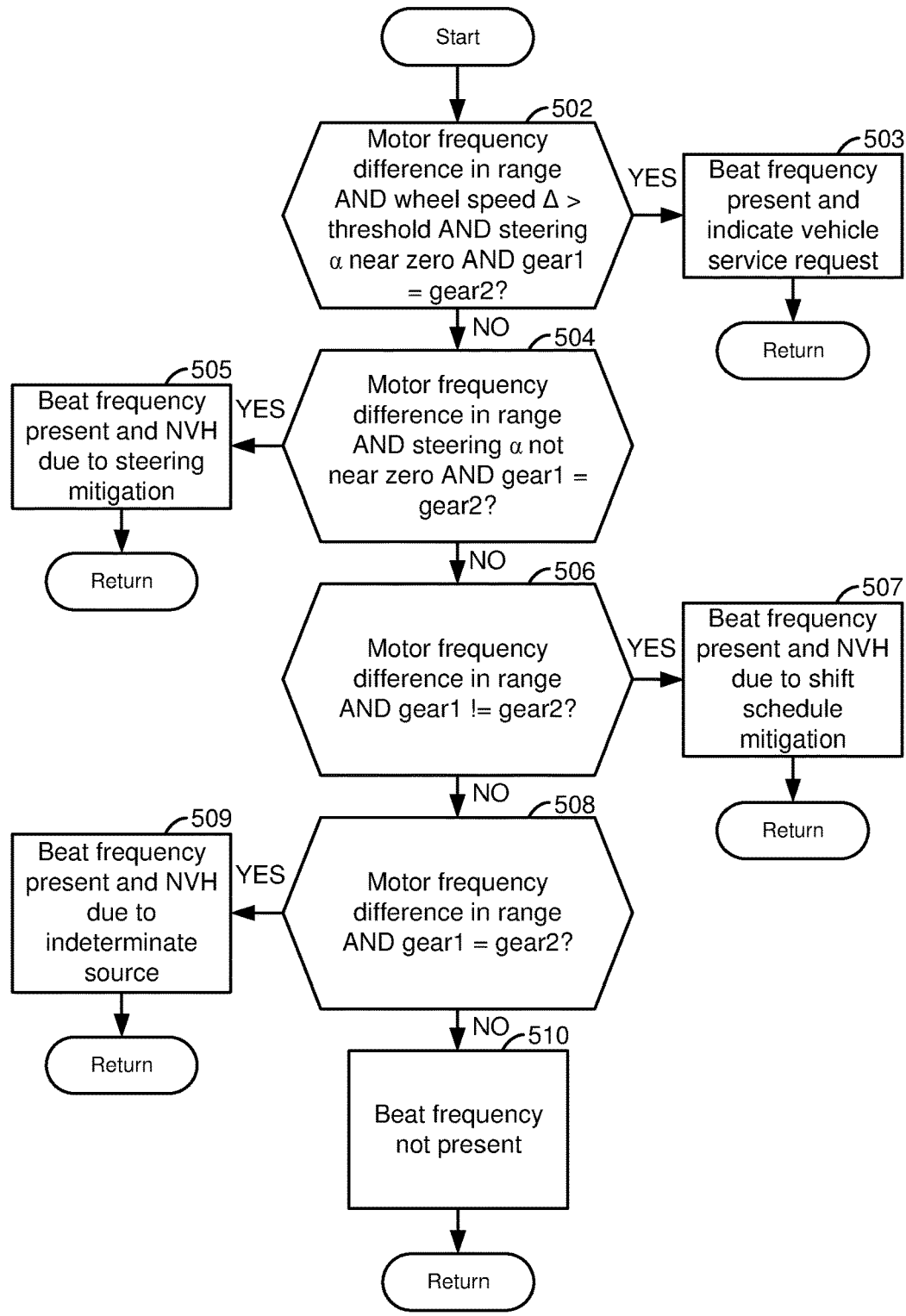

Referring now to FIGS. 3-5, a method for operating a tandem axle is shown. The method of FIGS. 3-5 may be included in the systems of FIG. 1 as executable instructions stored in non-transitory memory. Further still, at least portions of the method of FIGS. 3-5 may be actions performed in the physical world by a controller operating one or more actuators, for example.

At 302, method 300 judges whether or not traction control or anti-skid braking for the vehicle is activated. If so, the answer is yes and method 300 proceeds to exit. If not, the answer is no and method 300 proceeds to 304. Method 300 makes this judgement so that priority may be given to traction control and anti-skid braking systems.

At 304, method 300 receives input from wheel speed sensors, axle motor speeds, steering angle, and axle gear states. The inputs may be provided to the controller via sensors. Method 300 proceeds to 306.

At 306, method 300 detects or infers the presence or absence of a beat signal that may be generated via a tandem axle. In one example, the beat signal may be generated via combining a first signal generated via rotation of components (e.g., motor, shafts, and gears) of a first axle and a second signal generated via rotation of components of a second axle. Method 300 may detect the presence or absence of a beat signal as described in FIG. 5. Method 300 proceeds to 308.

At 308, method 300 judges whether or not a beat frequency has been detected or inferred. If so, the answer is yes and method 300 proceeds to 310. Otherwise, the answer is no and method 300 proceeds to exit.

At 310, method 300 determines a way to mitigate generation of the beat signal. Method 300 may mitigate a tandem axle generated beat signal as described in the method of FIG. 4. Method 300 proceeds to exit.

Referring now to FIG. 4, a method for mitigating a beat frequency generated via a tandem axle is shown. The method of FIG. 4 may be performed in cooperation with the method of FIG. 3 and the system of FIG. 1.

At 402, method 400 judges whether or not driver demand torque may be met by one axle of the tandem axle. For example, if driver demand torque is 600 Newton-meters of wheel torque and the first axle may generate up to 3000 Newton-meters of wheel torque, the answer is yes and method 400 proceeds to 405 to eliminate the source of the beat frequencies. If method 400 judges that the driver demand torque may be met via one axle of the tandem axle, the answer is yes and method 400 proceeds to 405. Otherwise, the answer is no and method 400 proceeds to 404.

At 405, method 400 commands the electric machine (e.g., motor) of the first axle of the tandem axle to produce the requested driver demand torque. The driver demand torque may be a torque output of the electric machine or a wheel torque. Alternatively, method 400 commands the electric machine of the second axle of the tandem axle to produce the requested driver demand torque. In some examples, method 400 may select alternatively which axle provides the requested driver demand torque in the presence of a beat signal being detected or inferred. For example, if a first beat signal is detected or inferred and the first or second axle has capacity to provide the driver demand torque, method 400 may select the first axle to provide all of the driver demand torque while the second axle provides zero or less than a threshold amount of driver demand torque (e.g., less than 10% of the driver demand torque). However, if a second beat signal is detected or inferred after the first beat signal is mitigated without detection or inferring any intermediate beat signals, then method 400 may select the second axle to provide all of the driver demand torque while the first axle provides zero or less than a threshold amount of driver demand torque. In this way, method 400 may provide the driver demand torque in the presence of beat signals by alternatively providing the driver demand torque solely via the first axle of the tandem axle or the solely via the second axle of the tandem axle. Alternating which axle generates the driver demand torque may equalize tire wear and axle wear. Additionally, method 400 may provide for axle receiving a zero value torque command to shift to neutral. Method 400 returns to the calling method (e.g., FIG. 3).

At 404, method 400 judges whether or not a gear shift by one of the two axles of the tandem axle will reduce a power level of the beat signal that is generated by the tandem axle and if driver demand may be met after the shift is completed. For example, if driver demand torque is 1000 Newton-meters at the wheels and the tandem axle has capacity to provide a maximum of 950 Newton-meters of wheel torque after a gear shift in a first axle from first to second gear is performed, then the answer is no and method 400 proceeds to 408. However, if driver demand torque is 1000 Newton-meters at the wheels and the tandem axle has capacity to provide a maximum of 1250 Newton-meters of wheel torque after a gear shift in a first axle from first to second gear is performed, then the answer is yes and method 400 proceeds to 407. If method 400 judges that driver demand may be met and shifting from a first gear to a second gear of an axle may lower a power level of a beat signal, then the answer is yes and method 400 proceeds to 407. Otherwise, the answer is no and method 400 proceeds to 408.

At 407, method 400 shifts from a first gear of one axle to a second gear of the one axle while maintaining a gear of the other axle in the tandem axle to separate the frequencies. For example, method 400 may shift from first gear of a first axle to second gear of the first axle while the second axle remains in first gear. Alternatively, method 400 may shift from first gear of a second axle to second gear of the second axle while the first axle remains in first gear. The gear shift that is made may be based on vehicle speed and driver demand. Additionally, method 400 may adjust torque outputs of the electric machines in the first axle and the second axle so that the driver demand torque is met after the gear shift. Method 400 returns to the calling method (e.g., method 300) after the gear shift is performed in only one axle of the tandem axles.

At 408, method 400 judges whether or not a gear shift by both of the two axles of the tandem axle will reduce a power level of the beat signal that is generated by the tandem axle and if driver demand may be met after the shift is completed. For example, if driver demand torque is 1000 Newton-meters at the wheels and the tandem axle has capacity to provide a maximum of 950 Newton-meters of wheel torque after a gear shift in both the first axle and the second axle is performed, then the answer is no and method 400 proceeds to 410. However, if driver demand torque is 1000 Newton-meters at the wheels and the tandem axle has capacity to provide a maximum of 1250 Newton-meters of wheel torque after a gear shift in both the first axle and the second axle is performed, then the answer is yes and method 400 proceeds to 409. If method 400 judges that driver demand may be met and shifting gears of both axles of a tandem axle, then the answer is yes and method 400 proceeds to 409. Otherwise, the answer is no and method 400 proceeds to 410.

At 409, method 400 shifts gears of both (e.g., first and second axles) of a tandem axle to move or adjust the operating points or conditions. In one example, method 400 may shift gears so as to avoid operating the axles in a particular speed range (e.g., from 30 revolutions per/minute (RPM) wheel speed to 35 RPM wheel speed). The particular speed range may be a same speed range as where a beat signal is detected or is expected to be detected. For example, if the speed range to be avoided is from 30 RPM to 35 RPM and wheel speeds of the first and second axles are approaching 30 RPM while the first and second axles are engaged in first gear, then the first and second axles may be shifted into second gear at or just before the wheel speeds reach 30 RPM. Additionally, method 400 may adjust torque outputs of the electric machines in the first axle and the second axle so that the driver demand torque is met after the gear shift. In this way, wheel speeds at which a beat signal is generated may be avoided, thereby mitigating the possibility of generating a beat signal. Method 400 proceeds to the calling method (e.g., FIG. 3).

At 410, method 400 adjusts the load fraction (e.g., torque output) of the two electric machines of the two axles that are included in the tandem axle to mitigate the effects of unavoidable beat frequencies. In one example, a first of the two electric machines is adjusted to a lower value of a maximum torque of the first electric machine or a torque that meets the driver demand. The second of the two electric machines is adjusted to zero torque or a torque that when combined with the torque output of the first electric machine provides the driver demand torque. In another example, method 400 adjusts a second of the two electric machines to a lower value of a maximum torque of the second electric machine or a torque that meets the driver demand. The first of the two electric machines is adjusted to zero torque or a torque that when combined with the torque output of the second electric machine provides the driver demand torque. By adjusting the load fraction of each electric machine that operates as a propulsion source, it may be possible to lower a power level of a beat that may be generated via a tandem axle. Method 400 proceeds to exit.

Referring now to FIG. 5, a method for determining and/or inferring the presence or absence of a beat frequency generated via a tandem axle is shown. The method of FIG. 5 may be performed in cooperation with the method of FIG. 3 and the system of FIG. 1.

At 502, method 500 judges whether or not a difference between a frequency of a first electric machine of the first axle of the tandem axle and a frequency of a second electric machine of a second axle of the tandem axle is in a predetermined range AND (e.g., logical operator) a difference between a wheel speed of a wheel of the first axle and a wheel speed of a wheel of the second axle is greater than a threshold AND a steering angle is near zero degrees (e.g., within +5 degrees of zero), and an engaged gear of the first axle (gear1) is equal to an engaged gear of the second axle (gear2). If these conditions are met, the answer is yes and method 500 proceeds to 503. Otherwise, the answer is no and method 500 proceeds to 504. These conditions may indicate that tire sizes between the two axles are different, which may lead to generation of a beat signal. The frequency of the first and second electric machines may be determined via the following equation:

$$f = \frac{\omega}{2 \cdot \pi}$$

where f is the fundamental frequency of the electric machine in the motor rotor reference frame, $\omega$ is the angular frequency of the electric machine and $\pi$ is the constant 3.14159. Additional frequencies of interest to monitor for beat frequencies may include $1^{st}$, $2^{nd}$ order, etc. of the motor fundamental frequency, as well as frequencies in the motor electrical reference frame (fundamental*#pole pairs), for example 12, 24, etc. and the stator reference frame (fundamental*#stator slots), for example 36, 72, etc., in which case the frequency of interest is calculated via the following equation:

$$f = \frac{\omega * \text{order}}{2 \cdot \pi}$$

At 503, method 500 provides an indication that a beat signal is present or may be present and requests that the vehicle be serviced. The indication may be provided via sending a message to a human/machine interface for display to vehicle occupants. Method 500 returns to the calling method (e.g., FIG. 3).

At 504, method 500 judges whether or not a difference between a frequency of a first electric machine of the first axle of the tandem axle and a frequency of a second electric machine of a second axle of the tandem axle is in a predetermined range AND (e.g., logical operator) a steering angle is greater than zero degrees (e.g., beyond ±5 degrees of zero), and an engaged gear of the first axle (gear1) is equal to an engaged gear of the second axle (gear2). If these conditions are met, the answer is yes and method 500 proceeds to 505. Otherwise, the answer is no and method 500 proceeds to 506. These conditions may indicate that the steering angle may be causing a difference in wheel speeds between the first and second axles of the tandem axle, which may cause a beat signal.

At 505, method 500 provides an indication that a beat signal is present or may be present due to a steering angle. The indication may be provided via sending a message to a human/machine interface for display to vehicle occupants. Method 500 returns to the calling method (e.g., FIG. 3).

At 506, method 500 judges whether or not a difference between a frequency of a first electric machine of the first axle of the tandem axle and a frequency of a second electric machine of a second axle of the tandem axle is in a predetermined range AND (e.g., logical operator) an engaged gear of the first axle (gear1) is not equal (!=) to an engaged gear of the second axle (gear2). If these conditions are met, the answer is yes and method 500 proceeds to 507. Otherwise, the answer is no and method 500 proceeds to 508. These conditions may indicate that the tandem axle gear shifting may be causing a difference in wheel speeds between the first and second axles of the tandem axle, which may cause a beat signal.

At 507, method 500 provides an indication that a beat signal is present or may be present due to gear shift scheduling. The indication may be provided via sending a message to a human/machine interface for display to vehicle occupants. Method 500 returns to the calling method (e.g., FIG. 3).

At 508, method 500 judges whether or not a difference between a frequency of a first electric machine of the first axle of the tandem axle and a frequency of a second electric machine of a second axle of the tandem axle is in a predetermined range AND (e.g., logical operator) an engaged gear of the first axle (gear1) is equal to an engaged gear of the second axle (gear2). If these conditions are met, the answer is yes and method 500 proceeds to 509. Otherwise, the answer is no and method 500 proceeds to 510. These conditions may indicate that there may be asymmetrical gearing that may be causing a difference in wheel speeds between the first and second axles of the tandem axle, which may cause a beat signal.

At 509, method 500 provides an indication that a beat signal is present or may be present due to asymmetrical gearing between the gear sets of the first axle and the second axle. The indication may be provided via sending a message to a human/machine interface for display to vehicle occupants. Method 500 returns to the calling method (e.g., FIG. 3).

At 510, method 500 determines that a beat frequency is not present. Method 500 returns to the calling method (e.g., FIG. 3).

In this way, the method of FIGS. 3-5 may identify the presence or absence of a beat signal that may be generated via combining two signals that may be generated by a first axle and a second axle of a tandem axle. Once a presence of a beat signal is determined, mitigating actions may be taken to reduce a power level of the beat signal so that the possibility of hearing or feeling the beat signal may be reduced.

The method of FIGS. 3-5 provides for a method for operating a tandem axle of a vehicle, comprising: adjusting operation of a first axle via a controller in response to a presence of a beat signal generated via the first axle and a second axle. In a first example, the method further comprises detecting the beat signal via a difference in a first wheel speed of the tandem axle and a second speed of the tandem axle. In a second example that may include the first example, the method further comprises detecting the beat signal via a steering angle. In a third example that may include one or both if the first and second examples, the method further comprises adjusting torque of a first electric machine in the first axle and adjusting torque of a second electric machine in the second axle. In a fourth example that may include one or more of the first through third examples, the method includes where the beat signal is generated via a first signal having a first frequency and a second signal having a second frequency. In a fifth example that may include one or more of the first through fourth examples, the method includes where the beat signal has a frequency that is lower than the first frequency and the second frequency. In a sixth example that may include one or more of the first through fifth examples, the method includes where adjusting operation of the first axle includes shifting from a first gear to a second gear. In a seventh example that may include one or more of the first through sixth examples, the method includes where adjusting operation of the first axle includes lowering a torque output of the first axle. In an eighth example that may include one or more of the first through seventh examples, the method includes where adjusting operation of the first axle includes adjusting a gear shift schedule of the first axle.

The method of FIGS. 3-5 also provides for a method for operating a tandem axle of a vehicle, comprising: adjusting operation of a first axle or a second axle of the tandem axle via a controller in response to a driver demand torque and a presence of a beat signal generated via the first axle and a second axle. In a first example, the method includes where adjusting operation of the first axle or the second axle includes reducing a torque of the first axle or a torque of the second axle to zero. In a second example that may include the first example, the method includes where adjusting operation of the first axle or the second axle includes adjusting a gear shifting schedule of the first axle or the second axle. In a third example that may include one or both of the first and second examples, the method includes where the first axle and the second axle are electrified axles. In a fourth example that may include one or more of the first through third examples, the method includes where the presence of the beat signal is determined via the controller.

Turning now to FIG. 6, a plot of an example of how a beat signal may be generated is shown. Plot 600 includes a vertical axis that represents an amplitude level of a signal. The horizontal axis represents time and time increases from the left side of the plot to the right side of the plot. Dotted line trace 602 represents a first signal that may be generated via rotating of a first axle of a tandem axle. The first signal may be generated by rotating an electric machine, gears, and/or shafts of the first axle. Solid line trace 604 represents a second signal that may be generated via rotating of a second axle of a tandem axle. The second signal may be generated by rotating an electric machine, gears, and/or shafts of the second axle. Dashed line trace 606 represents a beat signal that may be generated via the summation of the first signal and the second signal. In this example, the beat signal has a lower harmonic frequency that is about 2 hertz (Hz) and this frequency may be observed in the change in the amplitude of the trace 606 that occurs over a period of 0.5 seconds. The frequencies of trace 602 and 604 are near 100 Hz.

Moving on to FIG. 7, a table 700 representing a gear shift schedule for an axle is shown. Table 700 includes five columns 702 and four rows 704. Each row/column pair includes a number that indicates what gear is to be engaged in the axle. For example, row 1/column 1 indicated at 706 includes a value of one to indicate that the axle is to be engaged in first gear. The rows correspond to increasing driver demand values beginning at a value of zero and extending to a value of 750. Of course, in other examples the total number of rows may increase and the values corresponding to the rows may different than those that are shown in FIG. 7. The columns correspond to increasing vehicle speed values beginning at a value of zero and extending to a value of 80 kilometers/hour. Of course, in other examples the total number of columns may increase and the values corresponding to the columns may different than those that are shown in FIG. 7. Each axle may shift gears according to a schedule that is similar to the shift schedule that is shown in FIG. 7. Additionally, entries in a shift schedule for an axle may be changed so that one axle is engaged in a first gear and the other axle is engaged in a second gear for the purpose of avoiding generation of a beat signal. For example, row 2, column 3, which is indicated by cell 708 may be changed from a value of one to a value of two to reduce a possibility of generating a beat signal. Additionally, the first and second axles may be prevented from rotating at selected speeds where a beat signal may be generated. For example, row 2, column 4, and row 3, column 4 may be purposely avoided by shifting to gears that prevent the axle from rotating at the speeds and driver demand loads indicated at cells 710 and 712. By avoiding rotating the first and/or second axle at selected speeds, it may be possible to lower a power level of a beat signal so that the beat signal may not be felt or heard by vehicle occupants.

While various embodiments have been described above, it may be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the terms "approximately" and "substantially" are construed to mean plus or minus five percent of the range, unless otherwise specified.

The invention claimed is:

1. A method for operating a tandem axle of a vehicle, comprising:
adjusting operation of a first axle via a controller in response to a presence of a beat signal generated via the first axle and a second axle; and
adjusting torque of a first electric machine in the first axle and adjusting torque of a second electric machine in the second axle.

2. The method of claim 1, further comprising detecting the beat signal via a difference in a first wheel speed of the tandem axle and a second speed of the tandem axle.

3. The method of claim 1, further comprising detecting the beat signal via a steering angle.

4. The method of claim 1, where the beat signal is generated via a first signal having a first frequency and a second signal having a second frequency.

5. The method of claim 4, where the beat signal has a frequency that is lower than the first frequency and the second frequency.

6. The method of claim 1, where adjusting operation of the first axle includes shifting from a first gear to a second gear.

7. The method of claim 1, where adjusting operation of the first axle includes lowering a torque output of the first axle.

8. The method of claim 1, where adjusting operation of the first axle includes adjusting a gear shift schedule of the first axle.

9. A tandem axle system, comprising:
- a first axle including a first electric machine configured to provide propulsive effort via the first axle;
- a second axle including a second electric machine configured to provide propulsive effort via the second axle; and
- a controller including executable instructions stored in non-transitory memory that cause the controller to adjust operation of the first axle and the second axle in response to a beat signal, the beat signal generated via combining a first signal generated via the first axle and a second signal generated via the second axle.

10. The tandem axle system of claim 9, where adjusting operation of the first axle includes adjusting a first axle torque output, and where adjusting operation of the second axle includes adjusting a second axle torque output.

11. The tandem axle system of claim 9, where adjusting operation of the first axle includes adjusting a gear shifting schedule of the first axle.

12. The tandem axle system of claim 9, where adjusting operation of the second axle includes adjusting a gear shifting schedule of the second axle.

13. The tandem axle system of claim 9, further comprising additional instructions to determine a presence or absence of the beat signal.

14. The tandem axle system of claim 13, where the presence or absence of the beat signal is based on a first wheel speed and a second wheel speed.

15. A method for operating a tandem axle of a vehicle, comprising:
- adjusting operation of a first axle or a second axle of the tandem axle via a controller in response to a driver demand torque and a presence of a beat signal generated via the first axle and the second axle.

16. The method of claim 15, where adjusting operation of the first axle or the second axle includes reducing a first axle torque or a second axle torque to zero.

17. The method of claim 15, where adjusting operation of the first axle or the second axle includes adjusting a gear shifting schedule of the first axle or the second axle.

18. The method of claim 15, where the first axle and the second axle are electrified axles.

19. The method of claim 15, where the presence of the beat signal is determined via the controller.

20. A method for operating a tandem axle of a vehicle, comprising:
- adjusting operation of a first axle via a controller in response to a presence of a beat signal generated via the first axle and a second axle; and
- detecting the beat signal via a steering angle.

* * * * *